United States Patent
Sundholm (10) Patent No.: US 9,156,612 B2
(45) Date of Patent: Oct. 13, 2015

(54) METHOD AND APPARATUS FOR HANDLING MATERIAL IN A PNEUMATIC MATERIALS HANDLING SYSTEM

(75) Inventor: Göran Sundholm, Tuusula (FI)

(73) Assignee: MARICAP OY, Vantaa (FI)

( * ) Notice: Subject to any disclaimer, the term of this patent is extended or adjusted under 35 U.S.C. 154(b) by 365 days.

(21) Appl. No.: 13/578,494

(22) PCT Filed: Feb. 8, 2011

(86) PCT No.: PCT/FI2011/050109
§ 371 (c)(1),
(2), (4) Date: Aug. 10, 2012

(87) PCT Pub. No.: WO2011/098667
PCT Pub. Date: Aug. 18, 2011

(65) Prior Publication Data
US 2012/0308314 A1    Dec. 6, 2012

(30) Foreign Application Priority Data

Feb. 12, 2010  (FI) ...................................... 20105145
May 12, 2010  (FI) ...................................... 20100203

(51) Int. Cl.
*B65G 53/24*   (2006.01)
*B65F 5/00*    (2006.01)
*B65G 53/48*   (2006.01)
(Continued)

(52) U.S. Cl.
CPC .............. *B65F 5/005* (2013.01); *B02C 18/0084* (2013.01); *B02C 18/0092* (2013.01); *B65G 51/02* (2013.01); *B65G 53/48* (2013.01)

(58) Field of Classification Search
USPC ................ 406/51, 122, 151; 100/144; 53/439
See application file for complete search history.

(56) References Cited

U.S. PATENT DOCUMENTS 3,583,770 A * 6/1971 Medhammar ................. 406/76
3,621,774 A   11/1971 Dedio et al.
3,653,720 A * 4/1972 Craig ........................... 406/130
(Continued)

FOREIGN PATENT DOCUMENTS

DE  2504212 A1  8/1976
FI  74655 B     11/1987
(Continued)

OTHER PUBLICATIONS

Office Action "Notification of Reason for Refusal" dated Jan. 29, 2015 in JP 2012-552436.

*Primary Examiner* — Joseph Dillon, Jr.
(74) *Attorney, Agent, or Firm* — Birch, Stewart, Kolasch & Birch, LLP (57) ABSTRACT

Method for handling material in a pneumatic materials handling system, in which material, such as waste material, is input from an input aperture of an input point, such as from an input aperture of a refuse chute or of some other input point, and is handled with a shaping device, arranged in connection with the input point or in the proximity of it, to be more compact and is transferred onwards. The shaping device is a rotary shaper, which includes rotatable handling device, which includes an aperture, which is arranged eccentrically with respect to the axis of rotation, and which rotary shaper includes at least one stationary handling device, in which case the material to be handled is conducted into the rotary shaper and/or through it at least partly by means of gravity and/or suction and/or a pressure difference.

15 Claims, 4 Drawing Sheets

(51) Int. Cl.
*B65G 51/02* (2006.01)
*B02C 18/00* (2006.01)

(56) References Cited

U.S. PATENT DOCUMENTS

| | | | | |
|---|---|---|---|---|
| 4,051,961 A | * | 10/1977 | Williams | 414/518 |
| 4,072,097 A | * | 2/1978 | Seibel | 100/100 |
| 4,099,457 A | * | 7/1978 | Hyden | 100/42 |
| 4,615,647 A | * | 10/1986 | Lukacz | 406/60 |
| 4,787,321 A | * | 11/1988 | Schnellbacher et al. | 110/258 |
| 4,881,862 A | * | 11/1989 | Dick | 414/218 |
| 5,263,591 A | * | 11/1993 | Taormina et al. | 209/630 |
| 5,333,146 A | * | 7/1994 | Vance | 373/60 |
| 5,337,795 A | * | 8/1994 | Mihail et al. | 141/144 |
| 5,356,280 A | * | 10/1994 | Ponzielli | 425/201 |
| 5,860,232 A | * | 1/1999 | Nathenson et al. | 37/466 |
| 6,158,926 A | * | 12/2000 | Precetti | 406/39 |
| 7,743,717 B2 | * | 6/2010 | Vera | 110/109 |
| 2005/0051029 A1 | * | 3/2005 | Lloyd | 96/109 |
| 2006/0108270 A1 | * | 5/2006 | Kosanda et al. | 210/198.1 |
| 2009/0199727 A1 | * | 8/2009 | Sargent | 100/42 |
| 2011/0121112 A1 | * | 5/2011 | Alford | 241/15 |
| 2013/0189155 A1 | * | 7/2013 | Yamanobe et al. | 422/5 |

FOREIGN PATENT DOCUMENTS

| | | |
|---|---|---|
| JP | 47-16147 U | 10/1972 |
| JP | 63-162050 A | 7/1988 |
| JP | 63-133505 U | 9/1988 |
| JP | 0545598 U | 6/1993 |
| JP | 2002-85997 A | 3/2002 |
| JP | 2006-82065 A | 3/2006 |
| JP | 2007-54804 A | 3/2007 |
| WO | WO 82/03200 A1 | 9/1982 |
| WO | WO 01/21315 A1 | 3/2001 |
| WO | WO 2009/130374 A1 | 10/2009 |

* cited by examiner

FIG. 7a  FIG. 7b

METHOD AND APPARATUS FOR HANDLING MATERIAL IN A PNEUMATIC MATERIALS HANDLING SYSTEM

BACKGROUND OF THE INVENTION

The invention relates generally to materials handling systems, such as to partial-vacuum conveying systems, more particularly to the collection and moving of wastes, such as to the moving of household wastes.

Systems wherein wastes are moved in piping by means of an air current produced by a pressure difference or suction are known in the art. In these, wastes are moved long distances in the piping. It is typical to these systems that a partial-vacuum apparatus is used to bring about a pressure difference, in which apparatus a partial vacuum is achieved in the transfer pipe with partial-vacuum generators, such as with vacuum pumps or with an ejector apparatus. A transfer pipe typically comprises at least one valve means, by opening and closing which the replacement air coming into the transfer pipe is regulated. Input points at the input end of the material are used in the systems, from which input points the material, such as wastes, is transferred into the system. The system can also comprise refuse chutes into which material, such as waste material, is input and from which the material to be transferred is transferred into a transfer pipe by opening a discharge valve means, in which case, by means of the sucking effect achieved by the aid of the partial vacuum acting in the transfer pipe and also by means of the surrounding air pressure acting via the refuse chute, material such as e.g. waste material packed into bags, is transferred from the refuse chute into the transfer pipe. The pneumatic waste transfer systems in question can be utilized particularly well in densely populated urban areas. These types of areas have tall buildings, in which the input of wastes into a pneumatic waste transfer system is performed via a refuse chute arranged in the building.

The refuse chute is a vertical pipe, preferably comprising a number of input points, which are typically arranged in the wall of the refuse chute at a distance from each other. Tall buildings can comprise many tens, even hundreds, of storeys, in which case the refuse chute forms a very high pipe.

Wastes are transferred pneumatically in a closed system to the reception station, in which the wastes are compressed with a press only after transportation. The pipes of a pneumatic transfer system are in normal cases rather large in diameter, e.g. in the region of 500 mm in their diameter.

Also known in the art are solutions wherein a waste mill, such as a waste grinder, with which the wastes to be input are ground into small size, is arranged in connection with or in the proximity of a waste input location. A waste mill grinds wastes but does not compress the wastes. In the solution in question the blades of waste mills are also subjected to large stressing, in which case they must be replaced often.

Publication WO8203200 A1 discloses a device for fine-grinding, compressing and outputting a high-volume bulk good, more particularly household wastes, by means of which the waste material conducted through the device can be compacted. In the solution according to the publication large output powers are typically needed, especially in situations in which the device is used to cut or fine-grind a material, in which case the energy consumption of the drive devices and the costs of the drive devices are high. In addition, the passage of stones or other corresponding material between the cutting blades can produce breakage of the blades.

The aim of the present invention is to achieve a new type of solution in connection with input points of wastes, or in connection with refuse chutes or waste bins, by means of which the drawbacks of prior art will be avoided.

BRIEF DESCRIPTION OF THE INVENTION

The solution according to the invention has a number of important advantages. By means of the invention a particularly efficient solution for the handling of material, more particularly for pneumatic pipe transport, is achieved. With the solution according to the invention the material to be handled is made to be centered, i.e. is brought towards the center, in which case the material can be efficiently fitted into a transport pipe or a container. More particularly, waste material can with the solution according to the invention be efficiently compacted with the rotary shaper according to the invention and efficient transportation can be achieved with a significantly smaller pipe size compared to unshaped waste material. By using suction, in addition to gravity, to transfer the material to be handled from the rotary shaper into the transport pipe, an advantageous solution for a combination of a rotary shaper and pipe transport is achieved. By forming the output aperture of the rotary shaper to be to some extent smaller than the cross-sectional area of the transport pipe, effective transfer of the handled material into the transport pipe by means of suction can be achieved. By forming the shape of the aperture of the handling means, an extremely efficient shaping of the material to be handled for onward transportation can be achieved. With a certain magnitude of the angle between the edges of the apertures of consecutive handling means, effective operation of the apparatus is achieved. Via the pathway of the medium, some medium, such as gas and/or liquid, can be conducted to the butt-end surfaces of the handling means. Typically the medium is air. The medium can, on the other hand, facilitate the rotation of the handling means by reducing friction between them and the surfaces supporting them. It can also be conceived that the air functions as some kind of bearing for the handling means. By means of the medium, more particularly with compressed air blowing, stone chips, glass chips and other such chips that cause wear can be prevented from going between the handling means and the support surfaces. The medium can also function as a type of air bearing for the shaping means. Further, it can be advantageous to bring about an air current by directing at least a part of the replacement air via the medium channels and/or from between the handling means such that in suction the seals admit inward air. In this case the air assists the transfer of the material to be handled in the rotary shaper towards the output aperture and onwards into the output aperture. Replacement air can be brought into the rotary shaper e.g. in a corresponding manner to what has been done in connection with refuse chutes, e.g. by applying the solution of publication WO/2009/13037 in connection with the rotary shaper.

The handling devices of a rotary shaper are preferably driven with a drive device and with an applicable power transmission means. According to one preferred embodiment a belt transmission is used to transmit force. There can be one or more drive devices. When using hydraulic motors, the available torque can be increased by using two motors. The motors can be controlled on the basis of pressure, in which case at first both the rotatable handling means are driven with one shared motor and when the pressure of the system grows, owing to the material to be handled, the second motor is connected into use. In this case, according to the embodiment, the torque increases, e.g. doubles, and the speed of rotation decreases, e.g. halves. According to a second preferred embodiment, the drive devices can be connected so that each rotatable handling means can, if necessary, be rotated with its own motor(s), in which case the direction of rotation can be changed individually, in which case the handling means can be rotated, if necessary, in opposite directions with respect to each other. Additionally, if necessary, the whole output power can be connected to drive only just one rotatable handling means. On the other hand, the material to be handled can be further compressed with a second compression phase arranged between the output aperture of the rotary shaper and the transport pipe, in which compression phase the compression device is a piston-cylinder combination. With the second compression device also the transfer of handled material into a transfer pipe is achieved.

BRIEF DESCRIPTION OF THE FIGURES

In the following, the invention will be described in more detail by the aid of an example of its embodiment with reference to the attached drawings, wherein.

DETAILED DESCRIPTION OF THE INVENTION

Figure 1:
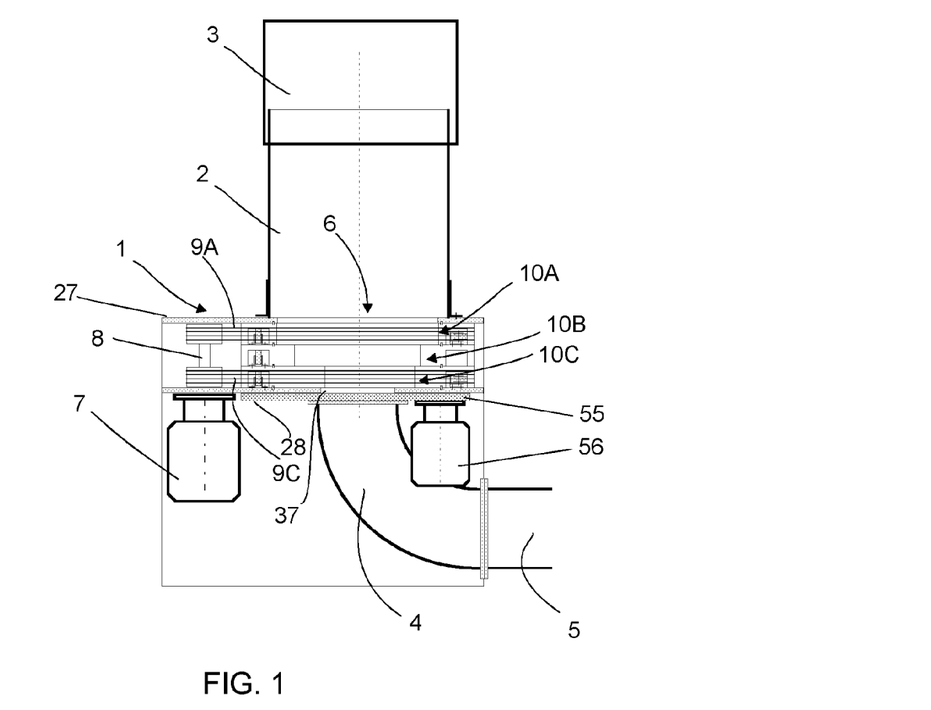
FIG. 1 presents a simplified embodiment of an apparatus according to the invention.

FIG. 1 presents one embodiment of the solution according to the invention, in which the rotary shaper device 1 is arranged in connection with a refuse chute 3 or corresponding with a fitting part 2. Only a part of the refuse chute is presented. The material, such as household waste, waste paper, cardboard or other waste, is input into a refuse chute 3 and from there onwards, via a fitting part 2, into an input aperture 6 of the rotary shaper 1. The material to be handled is shaped and compacted in the rotary shaper and after handling is conducted via an output coupling 4 into transfer piping 5 by means of suction and/or a pressure difference produced by e.g. the drive devices of a pneumatic pipe transport system. One advantage of the embodiment of the invention is that the waste material is made into a suitable shape, in which it fits for transferring in transport piping 4, 5. In this case transfer piping 5 that is significantly smaller in diameter can be used. According to one embodiment e.g. a pipe with a diameter in the region of 150-300 mm, preferably in the region of 200 mm, can be used as a transfer pipe 5. According to the invention simultaneous suction is used in the embodiment, in which case the material to be handled can be influenced with suction or a pressure difference acting via the transfer pipe 5 and the output coupling 4 when conducting the material through the handling means 10A, 10B, 10C of the rotary shaper 1.

The handling means are rim-like, each of which has an aperture 11A, 11B, 11C (FIGS. 4a, 4b, 4c, 6a, 6b, 6c) from the first side, from the input side, to the output side. At least a part of the handling means are rotated in the embodiment of the figure around the vertical axis with the drive device 7 and with the transmission means 8, 9A, 9C. In the figure the topmost rotatable handling means 10A and the bottommost rotatable handling means 10C are rotated, and between them remains a non-rotating, stationary handling means 10B. A valve means 55, such as a disc valve, which is driven with a drive device 56 of the valve, can be below the rotary shaper 1. The valve means 55 opens and closes the connection between the rotary shaper and the output coupling 4 and thus with the valve means 55 the suction effect from the transfer pipe into the rotary shaper is adjusted.

Figure 2:
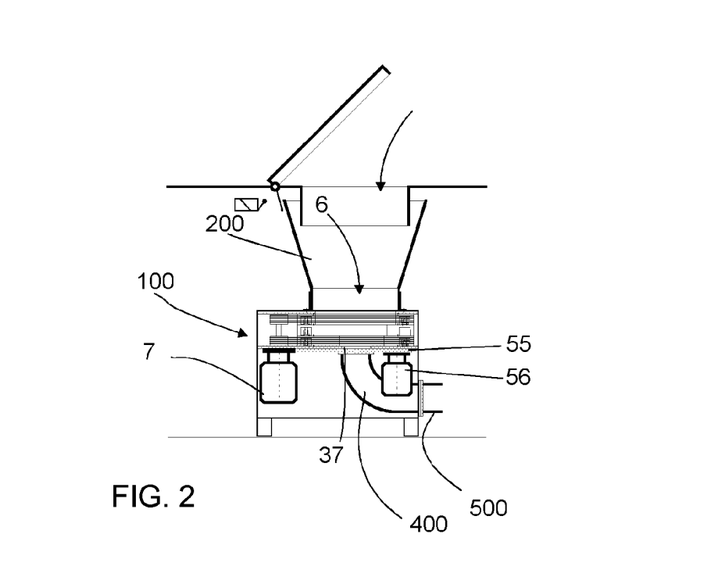
FIG. 2 presents a simplified embodiment of an apparatus according to the invention.

Correspondingly, according to the second embodiment of the invention, the rotary shaper is used in the embodiment of FIG. 2 in connection with an input point of the materials transfer system, such as in connection with an input point of kitchen waste. The rotary shaper 100 is fitted in connection with the feeder hopper 200 of an input point, in which case the material to be handled is input from the feeder hopper 200 into the input aperture 6 of the rotary shaper. In the rotary shaper the material is shaped into a suitable shape for transportation in piping and is conducted from the output coupling 400 to further handling, e.g. via the transfer piping 500 of a pneumatic pipe transport system.

Figure 3:
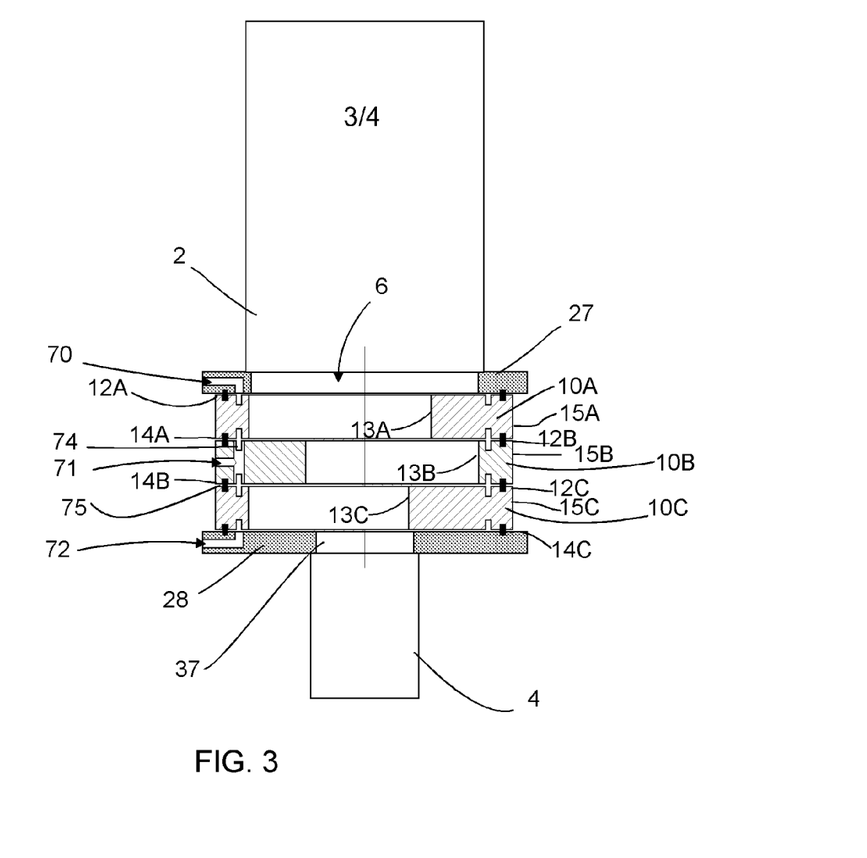
FIG. 3 presents a simplified and partially sectioned embodiment of an apparatus according to the invention.

FIG. 3 presents a simplified and partially sectioned embodiment of one rotary shaper according to the invention. In the figure the rotary shaper is presented without any drive devices and transmission means of the shaping means and with one drive device of the embodiment of the rotary shaper 1 removed. The rotary shaper comprises a frame, onto which ring-shaped handling means 10A, 10B, 10C are arranged. In the vertical direction a plurality of ring-like handling means 10A, 10B, 10C, which comprise an aperture 11A, 11B, 11C leading from the first side to the second side of the ring, are arranged below the input aperture 6 of the material to be handled. The ring-like handling means are fitted in connection with a relative rotational movement around a geometric axis, which is mainly identical with the geometric axis of an input chute, to transfer an inputted bulk good into the center of the rings through the ring-like handling means by gravity and/or by means of the suction/pressure-difference produced by the partial-vacuum generators of a pneumatic materials handling system, such as of a pipe transport system, at least by shaping the bulk good simultaneously with the combined action of the rotating rings and at least one stationary (non-rotating) ring. The handling means 10A, 10B, 10C can be fitted to rotate in opposite directions to each other, but as is presented in the figures in the preferred embodiment, every second ring-like handling means 10B (in the figure, the centermost handling means 10B) is fixed immovably to the frame and every second ring-like handling means 10A, 10C (in the figure, the topmost and the bottommost handling means) is fixed rotatably. The speed of rotation and the direction of rotation of the rotatable handling means can be varied. Additionally, according to one embodiment the rotary torque can be varied. The handling means 10A, 10C can be rotated individually according to one embodiment, in which case each handling means has its own drive device.

The ring-like handling means 10A, 10B, 10C, or at least a part of them, and the inner surface 13A, 13B, 13C of their apertures 11A, 11B, 11C are patterned and/or arranged to be such in their shape that their rotational movement simultaneously feeds material onwards from an aperture 11A, 11B, 11C towards the output end and the output aperture 37. Typically at least the rotating handling means 10A, 10C are arranged to be such that they transfer material towards the output end and the output coupling 4.

The material conducted through the handling means 10A, 10B, 10C in the rotary shaper is compressed and compacted. The output aperture 37 of the rotary shaper is, according to one embodiment, arranged to be to some extent smaller than the diameter of the next pipe, such as of the transfer pipe 4, 5. By forming the output aperture of the rotary shaper to be to some extent smaller than the diameter of the transport pipe, effective transfer of the handled material into the transport pipe by means of suction can be achieved.

The rotatable handling means are rotated by a drive device 7, e.g. by means of a transmission means, such as a belt transmission 8, 9A, 9C. The outer rim 15A, 15C of a ring-like handling means 10A, 10C is fitted to function as a countersurface of the transmission means of the power transmission of the drive device, e.g. for a belt means, which countersurface is included in the power transmission apparatus for bringing about rotation of a ring. The outer rim 15A, 15C of the handling means 10A, 10C can be shaped suitably. For example, a cambered or barrel-like shape has been observed to be very effective in one embodiment. The rotation trajectory of a handling means is achieved by arranging e.g. limiting means and/or bearing means and a countersurface to the ring-like handling means, most suitably a rim-like rolling surface or sliding surface, onto the rim of which the limiting means or bearing means are arranged in a distributed manner.

Typically the limiting means and/or bearing means are arranged between the bottommost ring-like handling means 10C and the base part 28 of the frame part, between the bottommost ring-like handling means 10C and the centermost, most suitably non-rotating, handling means 10B, and between the non-rotating handling means 10B and the topmost handling means 10A. It can also be conceived that separate rolling means are not used, but instead the handling means are arranged to rest on one another and/or to rest on the base part 28 of the frame part. In this case the bringing of the medium to between the handling means and the support surfaces that is described below can be utilized.

Figure 3A:
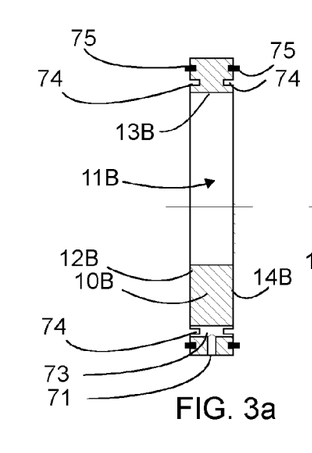
FIG. 3a presents a handling means of an apparatus according to the invention, sectioned along the line A-A of FIG. 3b.
Figure 3B:
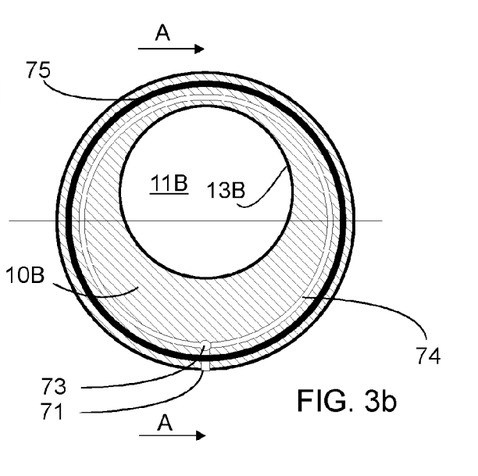
FIG. 3b presents a handling means of an apparatus according to the invention.

In the embodiments of FIGS. 3, 3a and 3b the rotary shaper is provided with means for leading the medium to the butt-end surfaces of the handling means. According to FIG. 3, pathways 70, 71, 72 of the medium are formed in the non-rotating lid plate and in the base plate of the device as well as in the non-rotating handling means, with which pathways medium can be conducted to the surface that is against the rotatable handling means 10A, 10C. According to FIGS. 3a and 3b, the pathway of the medium is in connection with a groove 74 opening towards the surface. The handling means and/or the lid part and the base part comprise a sealing means 75. Via the pathway of the medium, some medium, such as gas and/or liquid, can be conducted to the butt-end surfaces of the handling means. Typically the medium is air. The air can come as replacement air under the effect of suction produced by the pneumatic system into the piping 4, 5 of or it can be delivered with a pump device, such as with an air compressor (not shown). The medium can, on the other hand, facilitate the rotation of the handling means by reducing friction between them and the surfaces supporting them. It can also be conceived that the air functions as some kind of bearing for the handling means.

By means of the medium, more particularly with compressed air blowing, stone chips, glass chips and other such chips that cause wear can be prevented from going between the handling means and the support surfaces. As explained above, this can also function as a type of air bearing.

Further, it can be advantageous to bring about an air current by directing at least a part of the replacement air via the medium channels 70, 71, 72, 73, 74 and/or from between the handling means such that in suction the seals 75 admit inward air. In this case the air assists the transfer of the material to be handled in the rotary shaper towards the output aperture and onwards into the output aperture 37.

The diameter of the output aperture 37 is thus in one embodiment to some extent smaller than the diameter of the section of transfer pipe 4, 5 following it. According to one embodiment the diameter of the output aperture is at least 2-20 percent, preferably 4-15 percent, smaller than the section of transfer pipe following it. In this case, when the suction is on, the material to be handled does not stick to the inside wall of the pipe, but instead immediately accelerates into motion. According to a second embodiment the output aperture is at least 5 percent smaller than the section of transfer pipe following it. In one embodiment the diameter of the output aperture 37 is 180 mm, in which case the diameter of the transfer pipe is 210 mm.

The rotational movement of the handling means 10A, 10C can be achieved e.g. with an electric motor or with other arrangements. According to one preferred embodiment the rotational movement is achieved with a hydraulic motor such that both the rotatable handling means 10A, 10C are rotated with two shared hydraulic motors 7. In this case in the normal operating process both the handling means 10A, 10C can be rotated with one motor.

Figure 4A:
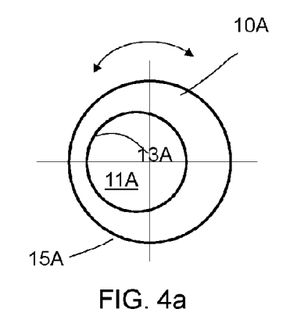
FIG. 4a presents a simplified first rotatable handling means of an apparatus according to the invention.
Figure 4B:
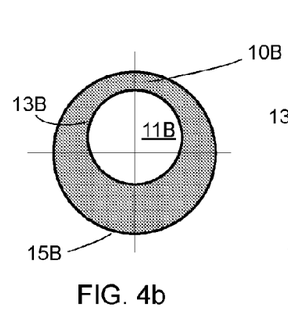
FIG. 4b presents a simplified first stationary (non-rotatable) handling means of an apparatus according to the invention.
Figure 4C:
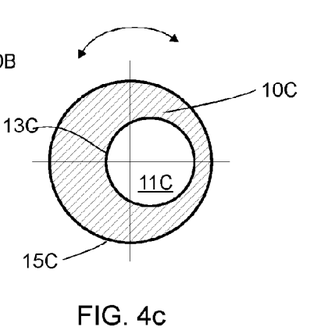
FIG. 4c presents a simplified second rotatable handling means of an apparatus according to the invention.

In the embodiment according to FIGS. 4a, 4b, 4c, handling means that have a round shape of the aperture 11A, 11B, 11C are presented. The apertures are arranged eccentrically with respect to the axis of rotation of the handling means. The aperture 11A, 11B, 11C of each handling means has an inner surface 13A, 13B, 13C. The inner surface of the apertures of the handling means shape the material to be handled. FIGS.

Figures 5A, 5B:
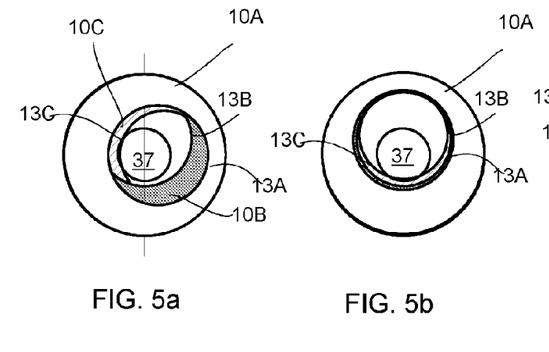
FIG. 5a presents a simplified view of one operating state of the first rotatable handling means, of the stationary handling means and of the second rotatable handling means of an apparatus according to the invention, as viewed in the input direction.
FIG. 5b presents a simplified view of a second operating state of the first rotatable handling means, of the stationary handling means and of the second rotatable handling means of an apparatus according to the invention, as viewed in the input direction.
Figure 5C:
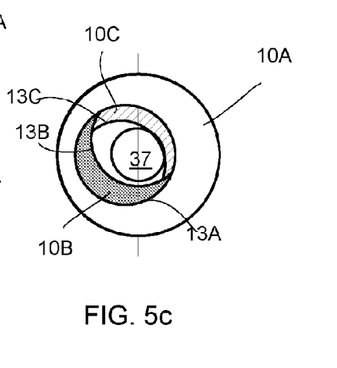
FIG. 5c presents a simplified view of a third operating state of the first rotatable handling means, of the stationary handling means and of the second rotatable handling means of an apparatus according to the invention, as viewed in the input direction.

5a, 5b, 5c illustrate different situations when the shaping means are moved during the handling of the material.

The rotary shaper thus functions in a way as a re-arranger and compactor (i.e. as a formatter). Under the effect of suction the handling means 10A, 10C of the rotary shaper shape the material to be handled so that it fits into an output aperture 37.

In the case of FIGS. 4a-4c, the shape of the aperture 11A, 11B, 11C of the handling means is a symmetrical hole (shape), e.g. round. It can be conceived that it is also some other shape, such as oval. In this case the direction of rotation can be varied. Should too large a load arise, the wheel stops and the direction of rotation are changed. When the load increases to be too large for one of the rotatable handling means, its direction of rotation is changed. The rotation is preferably detected with a motion sensor, e.g. from the diverting pulleys of the drive apparatus and/or from a pressure sensor of the hydraulics.

The apertures of the handling means can be of different sizes and in a different position with respect to the center, so that the loading can be efficiently distributed and that a sufficiently large aperture for waste is obtained.

It has been shown that the power required is extremely small, e.g. in the region of only 2-3 kW.

The handling means 10A, 10C can thus be rotated in opposite directions with respect to each other, in which case the material to be handled does not start to rotate along with the handling means. Rotation of the material would disrupt shaping of the material into the desired shape.

It is also advantageous to rotate the handling means at a different speed, because then the compression on each cycle changes at different points and a suitable compression for each waste is always obtained at some point.

With specific types of material, such as with cardboard and paperboard, a compressor means (not presented in the figures) can also be used, which compressor means compresses the wastes against the handling means from above.

This waste type probably also requires the aforementioned inner surface 13A, 13B, 13C of the shaped apertures 11A, 11B, 11C, which inner surface partly rips apart the cardboard and feeds it onwards.

Cardboard or other corresponding material types are typically challenging for pneumatic transportation, because a bent sheet easily opens and spreads against the inner surface of the piping and allows the air to pass it. With the apparatus according to the invention it is compacted and shaped into a suitable "cartridge", which is suited to the transport piping.

When the handling means 10A is rotating, the inner surface 13A determines the through-passage aperture 11A through the handling means that is free of obstacles. Means, such as a threaded groove or a band, which when the handling means rotates in the input direction at the same time feeds the material to be handled from the aperture 11A onwards in the handling direction, can thus be formed on the inner surface 13A of a handling means.

In the rotary shaper according to the invention a non-rotating handling means 10B is fitted below and supports the topmost rotating handling means 10A, which non-rotating handling means is fixed to the housing with fixing elements. The non-moving handling means 10B is typically formed in a corresponding manner to the rotating ring 10A described earlier.

In a corresponding manner the second rotatable handling means 10C also comprises an aperture 11C, which comprises an inner surface 13C, as is seen especially from the diagrammatic FIG. 4c.

According to one embodiment the aperture 11A, 11B, 11C of each consecutive handling means is smaller in the transport direction of the material than the aperture of the preceding handling means, in which case the pathway towards the output aperture 37 narrows.

The bottommost rotating handling means 10C is arranged rotatably on the base 28, which comprises an output aperture 37 for feeding out via it the bulk good compressed by means of the rings.

Figure 6A:
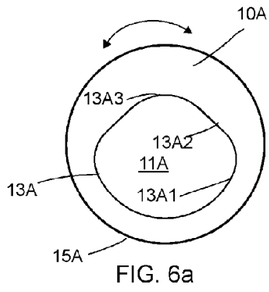
FIG. 6a presents a simplified embodiment of a first rotatable handling means of an apparatus according to the invention.
Figure 6B:
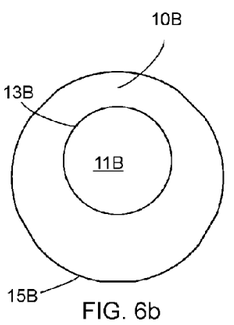
FIG. 6b presents a simplified embodiment of a first stationary (non-rotatable) handling means of an apparatus according to the invention.
Figure 6C:
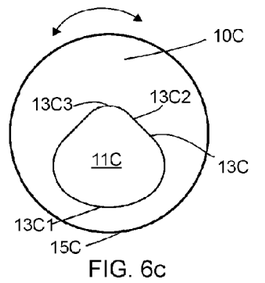
FIG. 6c presents a simplified embodiment of a second rotatable handling means of an apparatus according to the invention.

FIGS. 6a, 6b, 6c present still another embodiment, in which the apertures 11A, 11C of the handling means, of at least the rotatable handling means, are different to those in FIGS. 4a, 4b, 4c.

The edge 13A of the aperture 11A of the first handling means 10A presented by FIG. 6a has a shape containing an outer curved section 13A1 and a second inner curved section 13A3. A mainly straight section 13A2 connects these curved sections. There are two straight sections, in which case the shape of the aperture narrows from the side of the outer curved section 13A1 towards the inner curved section. The radius of curvature of the first curved section is greater than the radius of curvature of the second curved section.

FIG. 6b presents a first stationary, non-rotatable handling means 10B, which in the figure comprises a round aperture 11B, which has an edge 13B.

FIG. 6c presents a second rotatable handling means 11C, which has an aperture 11C, the edge 13C of which has a shape containing an outer curved section 13C1 and a second inner curved section 13C3. A mainly straight section 13C2 connects these curved sections. There are two straight sections, in which case the shape of the aperture narrows from the side of the outer curved section 13C1 towards the inner curved section 13C2. The radius of curvature of the first curved section is greater than the radius of curvature of the second curved section. The size of the aperture of the second rotatable handling means is typically smaller than the size of the aperture of the first rotatable handling means.

Figure 7A:
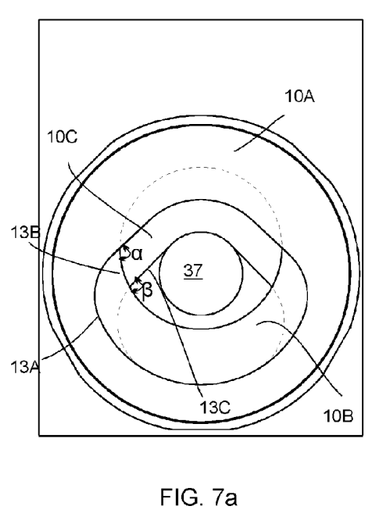
FIG. 7a presents a simplified view of one operating state of the first rotatable handling means, of the stationary handling means and of the second rotatable handling means of an embodiment of an apparatus according to the invention, as viewed in the input direction.
Figure 7B:
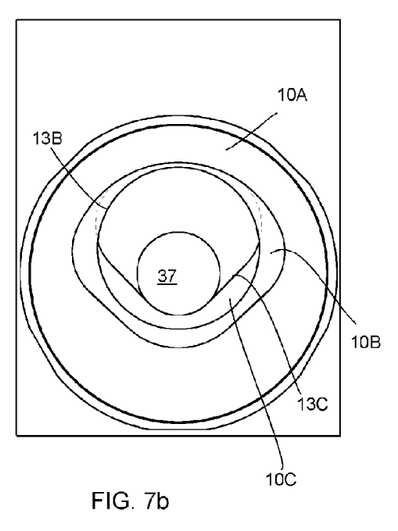
FIG. 7b presents a simplified view of a second operating state of the first rotatable handling means, of the stationary handling means and of the second rotatable handling means of an apparatus according to the invention, as viewed in the input direction.

FIGS. 7a and 7b present in simplified form a few different situations, as viewed in the input direction of the material, of the operation of the handling means 10A, 10B, 10C of FIGS. 6a, 6b, 6c.

When the handling means 10A, 10C are made to rotate via the drive device and the power transmission means, the inner surface 13A of the aperture 11A of the ring in the first ring 10A acts on the material, such as on the household waste, that flows into the input chute 2 from the refuse chute 3. A bulk good in this case is, on the one hand, pushed inwards towards the center of the ring and, on the other hand, downwards in the axial direction from the effect of gravity and/or from the effect of suction and/or from the effect of the means transferring the material, which means is achieved on the inner surface of the handling means. The bulk good in this case is forced into the grip of the inner surface 13B of the non-moving ring 10B disposed below the ring 10A. The bulk good becomes shaped, compressed and in this case also transfers in this ring, on the one hand, inwards towards the center of the ring and, on the other hand, in the axial direction towards the next rotating ring 10C. Radial variations are thus produced in connection with the transfer through all the rings during the simultaneous axial feed of the bulk good flow.

An angle $\alpha$ (alfa) forms between the inner surface 13A of the aperture 11A of the first handling means 10A and the inner surface 13B of the aperture 11B of the second handling means 10B at the point of their intersection point. FIG. 7a presents the angle $\alpha$ (alfa) on one side at the point of intersection of the edges 13A, 13B of the apertures 11A, 11B, but there is also an angle (not marked in the figure) on the second edge of the walls of the apertures, for which angle the same marking can be used generally in this context. It has been observed in tests that the angle α (alfa) between the edges of the apertures of handling means that are one above the other is in one embodiment larger than 45 degrees. In this case when at least the other of the handling means rotates the material behaves in the desired manner, shaping and transferring towards the center and not remaining "jammed" between the handling means at the point of the angle α (alfa) at the intersection point. When the edge of the aperture of the handling means is curved, the angle α (alfa) can be conceived to be formed between the straight tangents passing via the intersection points of the edges of the apertures.

Correspondingly, an angle β (beta) forms at the intersection point between the edges 13B and 13C of the apertures 11B, 11C of the second handling means 10B and the third handling means 10C. FIG. 7a presents the angle β (beta) on one side at the point of intersection of the edges 13B, 13C of the apertures 11B, 11C, but there is also an angle (not marked in the figure) on the second edge of the walls of the apertures, for which angle the same marking can be used generally in this context. It has been observed in tests that the angle β (beta) between the edges of the apertures of handling means that are one above the other is in one embodiment larger than 45 degrees. In this case when at least the other of the handling means rotates the material behaves in the desired manner, shaping and transferring towards the center and not remaining "jammed" between the handling means at the point of the angle (alfa) at the intersection point. When the edge of the aperture of the handling means is curved, the angle β (beta) can be conceived to be formed between the straight tangents passing via the intersection points of the edges of the apertures.

The magnitude of the angles α, β; alfa and beta remains in the desired range, according to one embodiment, although the direction of rotation of the rotatable handling means is varied.

The general operation of a prior-art rotary press is presented e.g. in publication WO8203200 A1, and it is not described in more detail in this publication.

The degree of shaping can be influenced with the size and shape of the apertures of the shaping means, and also with the patterning on the inner edge of the aperture. Household waste input as a shaped stream into the transfer pipe is transferred in the pipe onwards by means of suction and/or a pressure difference to the reception location, such as to a waste station or corresponding.

The invention thus relates to a method for handling material in a pneumatic materials handling system, in which material, such as waste material, is input from an input aperture of an input point, such as from the input aperture of a refuse chute 3 or of some other input point 200, and is handled with a shaping device 1 arranged in connection with the input point or in the proximity of it, to be more compact and is transferred onwards. The shaping device 1 is a rotary shaper, which comprises rotatable handling means 10A, 10C, which comprise an aperture 11A, 11C, which is arranged eccentrically with respect to the axis of rotation, and which rotary shaper comprises at least one stationary handling means 10B, in which case the material to be handled is conducted into the rotary shaper and/or through it at least partly by means of gravity and/or suction and/or a pressure difference.

According to one preferred embodiment at least a part of the handling means 10A, 10C of the rotary shaper when rotating feed the material to be handled through the handling means.

According to one preferred embodiment the rotatable handling means 10A, 10C shapes the material, together with at least one other preferably non-moving handling means 10B.

According to one preferred embodiment in the direction of travel of the material to be handled the cross-sectional area of the material flow passing through the handling means 10A, 10B, 10C of the rotary shaper is decreased such that the material can be conducted into the material transfer pipe 4, 5 disposed after the rotary shaper.

According to one preferred embodiment the direction of rotation of the rotatable handling means 10A, 10C can be varied.

According to one preferred embodiment the rotatable handling means 10A, 10C are driven with a drive device 7 such that the torque can be varied.

According to one preferred embodiment the direction of rotation of each rotatable handling means 10A, 10C can be varied individually.

According to one preferred embodiment the drive device 7 of a rotatable handling means is an electric motor, a pneumatic motor or a hydraulic motor.

According to one preferred embodiment the pneumatic materials handling system is a pipe transport system of material, more particularly of waste material.

According to one preferred embodiment medium is brought to the gap between at least a part of the handling means 10A, 10B, 10C and/or to the gap between the handling means 10A, 10B and the parts 27, 28 supporting them.

According to one preferred embodiment the mutual shape of the edges 13A, 13B, 13C of the apertures of the handling means 10A, 10B, 10C is fitted such that they center the input material independently of the direction of rotation of the rotatable handling means 13A, 13C.

The invention also relates to an apparatus for handling material in a pneumatic materials handling system, such as in a pipe transport system, which comprises at least one input point, such as a refuse chute 3 or some other input point 200, and a shaper device 1 arranged in connection with the input point or in the proximity of it, and means for transferring material onwards in the transfer piping. The shaper device is a rotary shaper 1, 100, a part of the rim-like handling means 10A 10B 10C of which are rotatable handling means 10A, 10C, and which handling means comprise an aperture 11A, 11B, 11C, which is arranged eccentrically with respect to the axis of rotation of the rotatable handling means, and a part are stationary handling means 10B, and that the material to be handled is fitted to be conducted into the rotary shaper and through it at least partly by means of gravity and/or suction and/or a pressure difference.

According to one preferred embodiment at least a part of the handling means 10A, 10B, 10C of the rotary shaper comprise surface patterning or a corresponding means, such as a thread section, that feeds material, which surface patterning is fitted, when the handling means 10A, 10C is rotated, to transfer the material to be handled through the compression phase formed by the handling means of a rotary press.

According to one preferred embodiment in the direction of travel of the material the cross-sectional area of the material pathway 11A, 11B, 11C passing through the handling means 10A, 10B, 10C of the rotary shaper decreases in the direction of travel of the material.

According to one preferred embodiment the apparatus comprises channel means 70, 71, 72 arranged in connection with the shaping means for bringing medium to the support surface 12A, 12B, 12C; 14A, 14B, 14C of at least a part of the shaping means 10A, 10B, 10C.

According to one preferred embodiment an input coupling 70, 71, 72 for medium and channeling 73, 74 for leading medium to the support surfaces 12A, 12B, 12C; 14A, 14B, 14C of a handling means or to between the handling means are arranged in the shaping means.

According to one preferred embodiment the output aperture 37 of the rotary shaper is smaller than the cross-sectional area of the transfer pipe 4, 5 following it in the material transfer direction.

According to one preferred embodiment the aperture 11A, 11B, 11C of the handling means is disposed eccentrically with respect to the axis of rotation.

According to one preferred embodiment at least in the input direction of the material the angle α, β; alfa, beta formed by the edges 13A, 13B; 13B, 13C of the apertures 11A, 11B; 11B, 11C of two consecutive handling means 10A, 10B; 10B, 10C is greater than 45 degrees.

According to one preferred embodiment the mutual shape of the edges of the apertures of the handling means is fitted such that they center the input material independently of the direction of rotation of the handling means.

According to one preferred embodiment the aperture 11A, 11B, 11C of the handling means is round or oval in shape.

According to one preferred embodiment the edge 13A, 13C of the aperture 11A, 11C of a handling means has a shape containing an outer curved section 13A1, 13C1 and a second inner curved section 13A3, 13C3, which curved sections are connected with a mainly straight section 13A2, 13C2.

According to one preferred embodiment the radius of curvature of the first curved section 13A1, 13C1 is greater than the radius of curvature of the second curved section 13A3, 13C3.

Typically the material is waste material, such as waste material arranged in bags. The refuse chute can be fitted to be a part of a pneumatic waste transfer system or it can be a separate part, in which waste material is conducted into the waste room, waste container or corresponding.

It is obvious to the person skilled in the art that the invention is not limited to the embodiments presented above, but that it can be varied within the scope of the claims presented below. The characteristic features possibly presented in the description in conjunction with other characteristic features can, if necessary, also be used separately to each other.

The invention claimed is:

1. An apparatus for handling material in a pneumatic materials handling system which comprises:
    at least one input refuse chute and
    a shaper device arranged to connect with the input refuse chute or in a close proximity to the refuse chute and
    means for transferring material from the shaper device, onwards to transfer piping,
    wherein the shaper device is a rotary shaper containing rotatable handling means and stationary handling means,
    wherein each of the handling means contains an aperture, each of said apertures being arranged eccentrically with respect to the axis of rotation of the rotatable handling means to shape the handling material, whereby the material to be handled is conducted into the rotary shaper and through it, at least partly by means of gravity and suction or a pressure difference.

2. The apparatus according to claim 1, wherein at least a part of the handling means of the rotary shaper comprises surface patterning which facilitates the transfer of the material being handled through a compression phase formed by the handling means of the shaper device.

3. The apparatus according to claim 1, wherein in a direction of travel of the material, the cross-sectional area of the material pathway passing through the handling means of the rotary shaper decreases in the direction of travel of the material.

4. The apparatus according to claim 1, wherein channel means and input coupling are arranged in the rotary shaper to define the relationship between support surfaces of the handling means.

5. The apparatus according to claim 1, wherein input coupling for medium and channeling for leading medium to support surfaces of the handling means or between the handling means, are arranged in the shaper device, and by means of the medium, chips that can cause wear can be prevented from going between the handling means and support surfaces and the rotation of the handling means is facilitated by reducing friction between the handling means and the support surfaces supporting the handling means, the medium being replacement air.

6. The apparatus according to claim 1, wherein the rotary shaper has an output aperture which is smaller than the cross-sectional area of the transfer piping in a direction of the material transfer.

7. The apparatus according to claim 1, wherein at least in an inputted direction of the material from the refuse chute, an angle (α; β) (alfa, beta) formed by the edges of the apertures of two consecutive ones of the handling means, is greater than 45 degrees.

8. The apparatus according to claim 7, wherein the mutual shape of the edges of the apertures of the handling means is defined so that they center the material that has been inputted, independently of a direction of rotation of the rotatable handling means.

9. The apparatus according to claim 1, wherein the apertures of the handling means are round or oval in shape.

10. The apparatus according to claim 1, wherein the edges of the apertures of the handling means have a shape containing an outer curved section and an inner curved section wherein the curved sections are connected with a mainly straight section.

11. The apparatus according to claim 10, wherein the radius of curvature of the outer curved section is greater than the radius of curvature of the inner curved section.

12. The apparatus of claim 1, wherein a valve means is operatively associated with the rotary shaper to facilitate the transfer of the waste material from the rotary shaper to the outlet coupling.

13. The apparatus of claim 12, wherein a drive device is provided for operating the valve means in operative association with the rotary shaper.

14. The apparatus of claim 1, wherein the stationary handling means is disposed between two rotatable handling means.

15. The apparatus of claim 1, wherein a drive device is provided for driving the rotation of the rotatable handling means.

* * * * *